US006748247B1

United States Patent
Ramakrishnan et al.

(10) Patent No.: US 6,748,247 B1
(45) Date of Patent: Jun. 8, 2004

(54) SYSTEM AND METHOD OF HANDLING DORMANCY IN WIRELESS NETWORKS

(75) Inventors: Kajamalai G. Ramakrishnan, Tewksbury, MA (US); Murali Aravamudan, Windham, NH (US); Shamim A. Naqvi, Morristown, NJ (US); Michael A. Champa, Weston, MA (US)

(73) Assignee: Winphoria Networks, Inc., Tewksbury, MA (US)

( * ) Notice: Subject to any disclaimer, the term of this patent is extended or adjusted under 35 U.S.C. 154(b) by 0 days.

(21) Appl. No.: 10/095,499

(22) Filed: Mar. 12, 2002

(51) Int. Cl.[7] .............................. H04B 1/38; H04M 1/00
(52) U.S. Cl. ...................... 455/574; 485/522; 485/464; 485/450; 370/311
(58) Field of Search ................................. 455/574, 422, 455/450, 451, 452, 464, 522, 517, 507, 500, 550, 572, 422.1, 452.1, 550.1; 370/311, 252, 342, 437, 441, 477

(56) References Cited

U.S. PATENT DOCUMENTS

| 6,119,024 | A | | 9/2000 | Takayama |
| 6,223,047 | B1 | | 4/2001 | Ericsson |
| 6,442,152 | B1 | * | 8/2002 | Park et al. |
| 6,480,476 | B1 | * | 11/2002 | Willars |
| 6,512,751 | B1 | * | 1/2003 | Struhsaker et al. |
| 6,643,262 | B1 | * | 11/2003 | Larsson et al. ............. 370/236 |
| 2002/0034190 | A1 | | 3/2002 | Baratz et al. |
| 2002/0071445 | A1 | * | 6/2002 | Wu et al. |
| 2002/0118653 | A1 | * | 8/2002 | Lomp et al. |
| 2002/0160812 | A1 | * | 10/2002 | Moshiri-Tafreshi et al. |
| 2003/0036354 | A1 | * | 2/2003 | Lee et al. |
| 2003/0040315 | A1 | | 2/2003 | Khaleghi et al. |
| 2003/0043766 | A1 | * | 3/2003 | McDonough et al. |
| 2003/0058793 | A1 | * | 3/2003 | Rochon et al. |

FOREIGN PATENT DOCUMENTS

GB  2 137 052 A  *  9/1984  ............ H04B/7/02

OTHER PUBLICATIONS

Schaffa F.; Willebeek–LeMair, M.; Patel, B "A high speed access protocol for LANs and WANs" Global Telecommunications Conference, 1993, including a Communications Theory Mini–Conference. Technical Program Conference Record, IEEE in Houston. GLOBECOM '93.*

Manning, S.; Gutierrez, A.; Wang, M.; "A short data burst mechanism for third generation CDMA wireless packet data" Vehicular Technology Conference, 1999 IEEE 49th, vol.: 1, Jul. 1999, Page(s): 521–525 vol. 1.*

* cited by examiner

Primary Examiner—Nay Maung
Assistant Examiner—Edan Orgad

(57) ABSTRACT

Methods and systems for determining and maintaining dormancy timers for subscribers in a wireless wide area network that promote efficient use of the radio channels are disclosed. Subscriber usage is monitored to determine subscriber usage statistics. Based on the subscriber statistics, a dormancy timer value is determined for a given subscriber. The dormancy timer for the given subscriber is then set with the dormancy timer value.

5 Claims, 4 Drawing Sheets

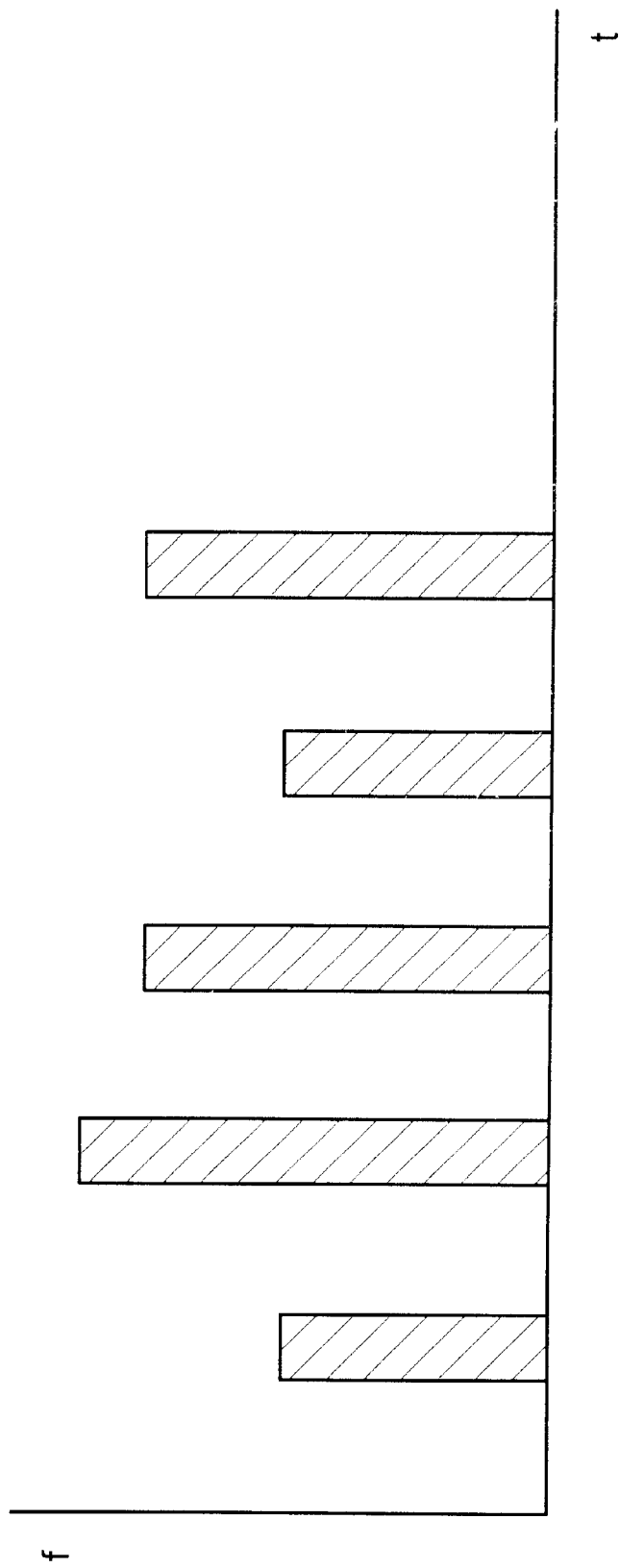

SYSTEM AND METHOD OF HANDLING DORMANCY IN WIRELESS NETWORKS

BACKGROUND

1. Field of the Invention

This invention relates to wireless wide area networks and, more particularly, to handling dormancy timers in a CDMA 2000 wireless network.

2. Discussion of Related Art

Subscribers are adopting wireless communications in increasingly large numbers. This trend is being fueled further by the attraction of wireless data. It is widely surmised that access to data services for mobile users will experience the magnitude of explosive growth witnessed in wire-line networks. New higher data rate interfaces under proposal are promising increased levels of bandwidth and access, rivaling that of wire-line networks.

So-called third generation (3G) networks are being proposed to provide higher data rates and other improvements. FIG. 1 illustrates an exemplary architecture of a 3G network in accordance with the CDMA 2000 proposal.

In the exemplary network, mobile stations 102 communicate over an air interface 103 with a radio access network (RAN) 104. The RAN 104 includes Base Transceiver Stations (BTS) 106 that are in radio contact with the mobile stations and that are in fixed line communication with a Base Station Controller (BSC) 108. The BSC 108 controls the radio equipment used to communicate with the mobile stations. This function is collectively referred to as Radio Resource Management, and it encompasses the management of handoffs of the roaming mobile stations 102 within a BSC and the allocation of radio channels for both voice and data traffic.

The BSC communicates with a Mobile Switching Center (MSC) 112, which is a standard Local End Office with enhanced call processing software (including mobility management) and (optional) hardware that can perform transcoding and rate adaptation functions. The traffic carrying capacity of the MSC is engineered using standard Erlang Traffic Management techniques. Traffic is assumed to adhere to Poisson arrivals with exponentially distributed holding times of the order of hundreds of seconds. Typically, signaling information between the RAN and the MSC is conveyed in accordance with a predefined protocol, and voice data is conveyed over bearer circuits in accordance with other protocols. Among other things, the MSC 112 provides mobility management functionality. This function consists of management of mobile station parameters such as the location of a mobile station, mobile identity and authentication. Handoffs between BSCs and between MSCs are controlled by the MSC. The MSC communicates with the Public Switched Telephone Network (PSTN) 114 using known signaling and bearer circuit protocols. A salient feature of these architectures is an end-to-end circuit telephony paradigm in which the explicit reservation of resources ensures service quality.

The 3G networks include new functions, not found in earlier proposals, to support packet data access networks (as opposed to circuit networks). For example, the CDMA2000 proposal includes two new network functions: the Packet Control Function (PCF) 110 and the Packet Data Serving Node (PDSN) 116. The PCF 110 may be co-located with the BSC 108 within the RAN 104. The PDSN 116 may be independently located and may communicate with the PCF via a Radio to Packet (R-P) interface. The PDSN communicates with an IP network 118 using IP based protocols.

The PCF 110 is responsible for ensuring that the packet data services are delivered properly on the radio side; i.e., over the air interface to the mobile stations 102. The PCF interfaces directly with the PDSN 116 to transfer user packet data through an interface called the R-P (Radio to Packet) interface. The PDSN 116 is a gateway to the data network 118 and terminates a logical link layer (PPP) to the mobile station 102. In short, it acts like a router for the data between the application on the mobile station 102 and the packet data network 118.

A key component of the CDMA2000 proposal is that call processing and mobility management remain under the purview of the MSC 112. The MSC sets up and releases all packet-switched data calls. It also manages the handoffs. Thus the MSC retains its key positioning in a CDMA2000 packet data network by continuing to provide a core set of functions.

The most valuable resource in a wireless network is the frequency spectrum allocated to the network operator. Maximizing the use of this resource, i.e., supporting as large a number of subscribers "on the air" as possible, is a crucial advantage. Circuit telephony, with its paradigm of explicit reservation of resources, does not make effective use of the spectrum resource if it dedicates unused resources to subscribers. This is widely recognized and the traditional solution is the so-called "busy hour" assumption, viz., that not all the subscribers to a resource will simultaneously attempt to use the resource and, moreover, the time a subscriber utilizes the resource, i.e., the holding time, will be limited. Under this assumption the number of subscribers that can be supported may be larger than the number of radio channels available in a RAN. This increase in subscribers is also referred to as the gain due to the statistical multiplexing of call arrivals.

The magnitude of statistical multiplexing gain relative to a given subscriber population is dependent on the holding time and the rate of call arrivals (number of calls in a given time period). In traditional mobile telephony the holding time of calls is assumed to be exponentially distributed with a mean value of 2–3 minutes. The rate of call arrivals has been extensively studied and a number of different statistical distributions have been proposed to capture the rate of call arrivals. The architecture of traditional circuit switches has most often been influenced by assuming that the rate of call arrivals is a random variable whose probability density function obeys the Poisson formulae. The key point in assuming that call arrival is a Poisson random variable implies that the mean and variance of this variable are the same; thus, the mean rate and variance of call arrivals at a switch does not significantly differ for a given set of subscribers. Intuitively, subscribers are not expected to make all of their calls in a very short period of time, or that the interval between successive calls does not vary by a large factor, i.e., the inter-call arrival time obeys an exponential distribution. Historical traffic analysis has borne out the viability of these assumptions. The behavior of a large set of subscribers in the aggregate over a large time interval exhibits Poisson characteristics.

The impact of packet switched data on spectral efficiency is of paramount importance. The mobile station is expected to operate in an "always on" mode in which a data session is established when the mobile station is powered on and this session is maintained until the mobile station is powered off. It would be infeasible to follow the circuit telephony paradigm and allow packet switched data calls to hold resources until the session is terminated.

To make more effective use of resources, a proposal called "dormancy" has been made to explicitly request and reserve spectral resources during a packet data session. Air resources should be released during the dormancy period so that other packet switched data sessions can make use of the spectrum; i.e., more subscribers can be supported on the same number of radio channels. An integral component of the dormancy proposal is that the PDSN is unaware of any issues related to dormancy. The function of granting and releasing air resources is delegated to either the BSC/PCF complex 108, 110 or the MSC 112.

The dormancy specification envisages a "dormancy timer" maintained by the BSC 108 for every packet data session. This timer is started by the BSC and mobile station after every packet reception or transmission. If the timer expires before the next packet reception or transmission, the air resources for that session are released. The request and release messages due to expiration of the dormancy timer for every packet data session appear as new call requests and releases to the MSC 112.

Proposals for managing and handling the dormancy timers have been lacking or are believed to be inefficient.

SUMMARY

The invention provides methods and systems for determining and maintaining dormancy timers for subscribers in a wireless wide area network that promote efficient use of the radio channels.

Under one aspect of the invention, subscriber usage is monitored to determine subscriber usage statistics. Based on the subscriber statistics, a dormancy timer value is determined for a given subscriber. The dormancy timer for the given subscriber is then set with the dormancy timer value.

Under another aspect of the invention, the subscriber usage statistics are for a given user. In yet another aspect of the invention, the subscriber usage statistics are for a class of subscriber.

Under still another aspect of the invention, histograms are used to approximate the probability density function of a user's silent time periods. The histogram is used to maximize a gain equation that is a ratio of the probability of a user being silent longer than $d+\overline{T}+3\ \sigma$ versus the probability of a user being silent longer than d, where d is the dormancy interval, $\overline{T}$ is the mean and $\sigma$ is the standard deviation of the talk time distribution.

BRIEF DESCRIPTION OF THE DRAWINGS

In the Drawing,

FIG. 4 is an exemplary histogram of silent time distribution for a user or a class of user.

DETAILED DESCRIPTION

The invention provides methods and systems for handling dormancy timers to provide improved efficiency of network resources. Under certain embodiments of the invention, dormancy timer values are determined on a per subscriber basis in view of talk and silence statistics. Under other embodiments of the invention, the dormancy timer is determined based on statistics pairing the subscriber with a given destination.

Figure 1:
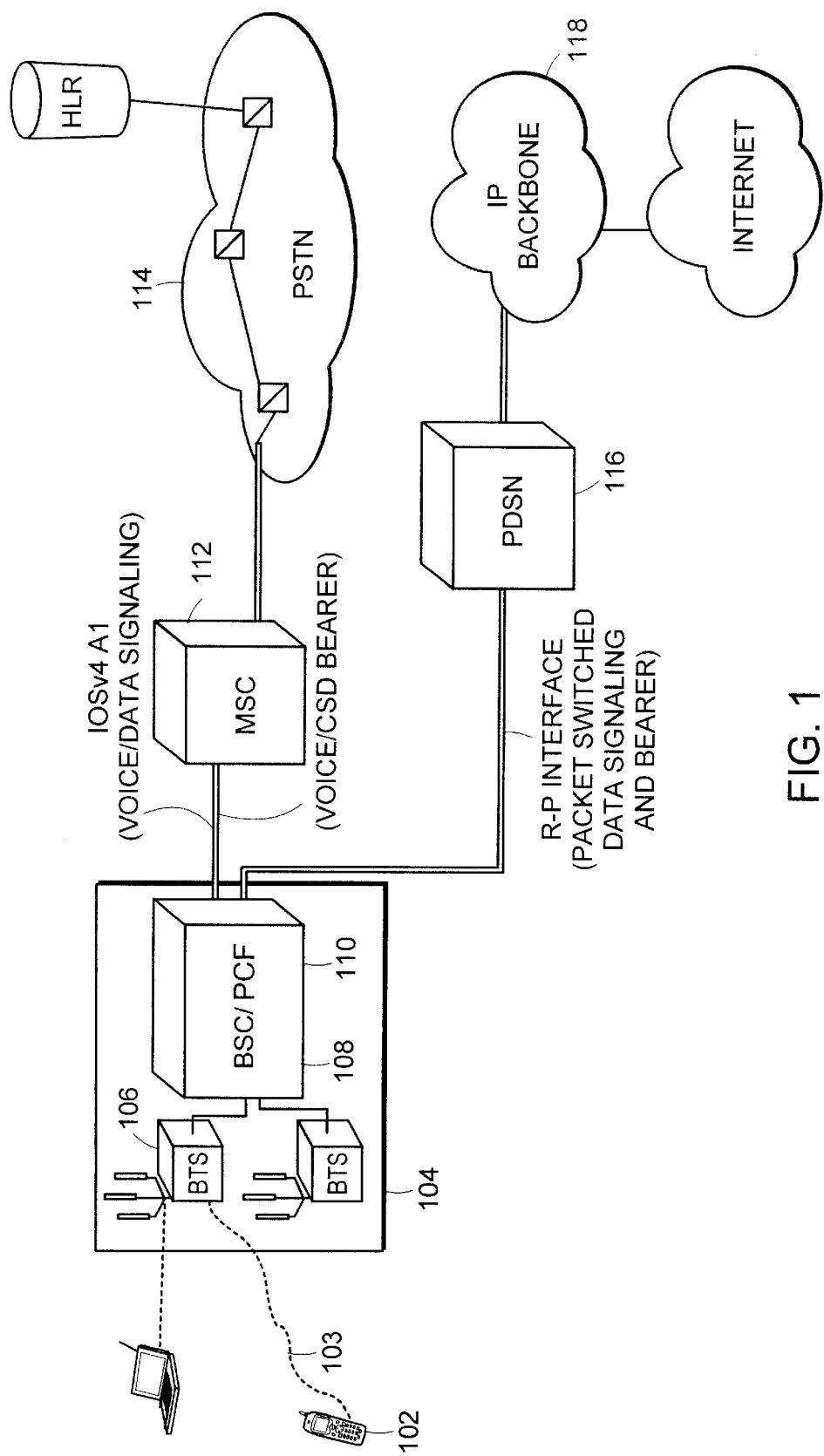
FIG. 1 is a system diagram of an exemplary wide area wireless network.
Figure 2:
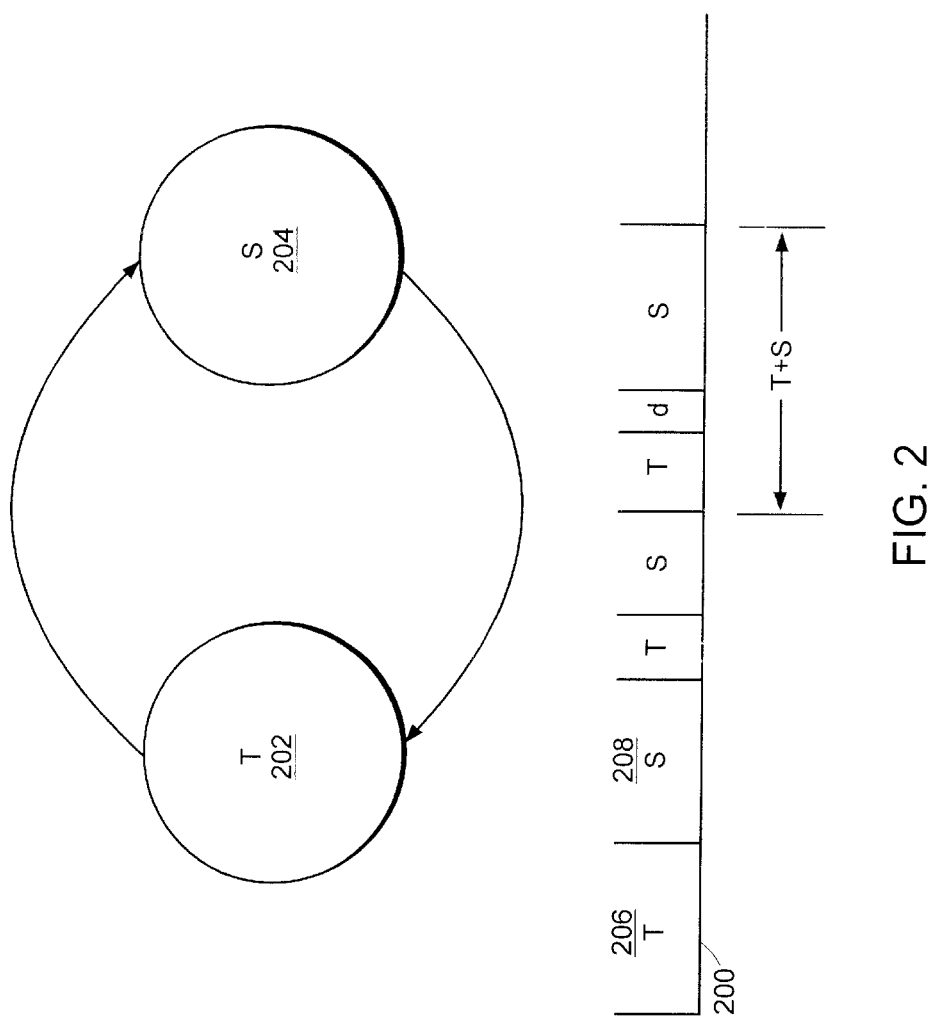
FIG. 2 is a state diagram and time line illustrating silent and talk states in accordance with certain embodiments of the invention.

Subscribers of packet switched data services with "always on" terminals engage in two main interspersed activities that can be captured by two states: Talk and Silence. In the Talk state, the subscriber (or mobile station) sends and receives packets. If this activity ceases (as indicated by the triggering of the dormancy timer) the subscriber transitions to the Silence state and remains in that state until data is to be received or sent again. At this point the subscriber transitions back to the Talk state. FIG. 2 shows the state model.

Viewed as events along a timeline 200, the mobile station enters the Talk state 202 when a new call request event is initiated. It then remains in that state until the expiration of the dormancy timer event, at which point the terminal enters the Silence state 204. The time interval spent in the Talk state (T) is referred to as the Talk Period 206; similarly the corresponding notion of a Silence Period (S) 208 is defined. The transitioning between these states repeats infinitely for an "always on" mobile station. The mobile station holds air resources (e.g., a radio channel of the air interface) during the Talk Period; air resources are released at the outset of the Silence Period.

If the value of the dormancy timer is greater than the Silence Period 208, the dormancy timer will not be triggered and dormancy will not have any impact on the network. This will be the case for subscribers who engage in sending or receiving large amounts of data, i.e., spend a lot of time in the talk state, or if the dormancy timer is set to some very large value. Intuitively, one would expect to see statistical multiplexing gains only if the value of the dormancy timer is substantially less than that of the Silence Period, i.e., smaller values of dormancy timer contribute to the statistical multiplexing gain.

As mentioned earlier, call and release requests triggered by a dormancy timer are seen as new signaling messages by a MSC 112. Thus, very small values of a dormancy timer will increase the number of times the dormancy trigger is fired, resulting in increasing the processing overhead at the switch. Telephony switches are typically engineered for long horizons. A measure of the capacity of a switch has been developed called the Busy Hour Call Attempts (BHCA). The BHCA capacity of a switch is defined as the number of channels multiplied by the calls per busy hour per channel. For example, if we assume a switch to have 16,000 channels and we assume a two minute holding time for calls, we get 30 calls per busy hour under 100% utilization, which gives 16,000×30=480,000 BHCA.

Typical deployed MSC switches 112 are engineered for 100K–500K BHCA at 2–3 minute holding times. The inter-call arrival period has historically been modeled by an exponential probability distribution. Thus, larger variances in the inter-call arrival period are improbable; i.e., the probability that the inter-call arrival period differs significantly with increasing number of calls decays exponentially.

Using the above assumptions, the inventors believe that modern MSC switches may get swamped with handling dormancy-related signaling messages, even with just a 10% market penetration of packet switched data (PSD) services and a dormancy timer of 2 seconds. Consequently, the problem arises that if the timer is set too short, the MSC switches may thrash with context switching, and if the time is set too long the statistical multiplexing gain is not substantial.

To address the above, certain embodiments of the invention provide dormancy timer values set to specific subscribers or classes of subscribers. Certain other embodiments establish subscriber/destination pairs to determine corresponding timer values. Still other embodiments provide specific manners of establishing efficient timer values.

The statistical multiplexing gain that results from the use of dormancy timers depends on the probability of a new arriving customer (e.g., a mobile station just turned on, or roams into the coverage area) finding a specified air channel (for data) unoccupied.

The mean gain can be shown to be theoretically equal to the following.

$$p''/(1-p'')$$

In the above $p''$ is the unnormalized probability that an arriving customer finds a dormancy timer tripped (i.e., a channel unoccupied and therefore usable).

It can be shown that the probability $p''$ may be given by the following:

$$\frac{\int_d^\infty (s-d) f_s(s) ds}{(\overline{S} + \overline{T})}$$

In the above, $f_s(s)$ is a probability distribution for silence time variable s; d is the dormancy timer value; $\overline{S}$ is the mean silent time; and $\overline{T}$ is the mean talk time.

From the above it can be seen that $p''$ is maximized when d is as small as possible. But, as explained above, if d is too small the MSC will experience excessive context switching. Under one embodiment of the invention, linear search logic is used to find the smallest timer value d given specified criteria. The logic uses the following parameters and functions:

$d_{ij}$ dormancy timer for subscriber i and destination j.

$f_T(t)$ is the probability density function of the talk period distribution T.

$f_{Sij}(s)$ is the probability density function of the silent period distribution for user i and destination j.

$\overline{T}$ is mean of the talk time distribution.

$\sigma$ is the standard deviation of the talk time distribution.

$\gamma$ a parameter to quantify the trade-off between context switching at the MSC and statistical multiplexing gain. For example, if channel resources are 5 times more important than statistical multiplexing gain, y could be set to 0.2 to reflect the trade-off, i.e., the desire to use the radio channels as efficiently as possible at the possible cost of loading the MSC.

$\xi$ is a parameter to quantify optimality tolerance, i.e., that the difference between the determined and optimal dormancy timer value is not more than $\xi$.

f( ) an estimation function that utilizes a user's silent time histogram information.

More specifically, f(d) is an approximation of the following:

$$f(d) \approx \int_{d+\overline{T}+3\sigma}^\infty f_S(s) ds$$

h( ) an estimation function that utilizes a user's silent time histogram information.

More specifically, h(d) is an approximation of the following:

$$h(d) \approx \int_d^\infty f_S(s) ds$$

More specifically, the logic of certain embodiments uses an iterative procedure to find the value d of the dormancy time that optimizes the function g(d), set forth below, within the bounds of the parameter $\gamma$. As explained above, this optimization of d may be made on a per subscriber basis, and may be made on a subscriber-destination basis.

$$g(d) = \frac{f(d)}{h(d)}$$

The functions f(d) and h(d) are based on the analysis of relevant histograms given the integral limits set forth above in the integral equations that are approximated. This will be explained below with examples.

Figure 3:
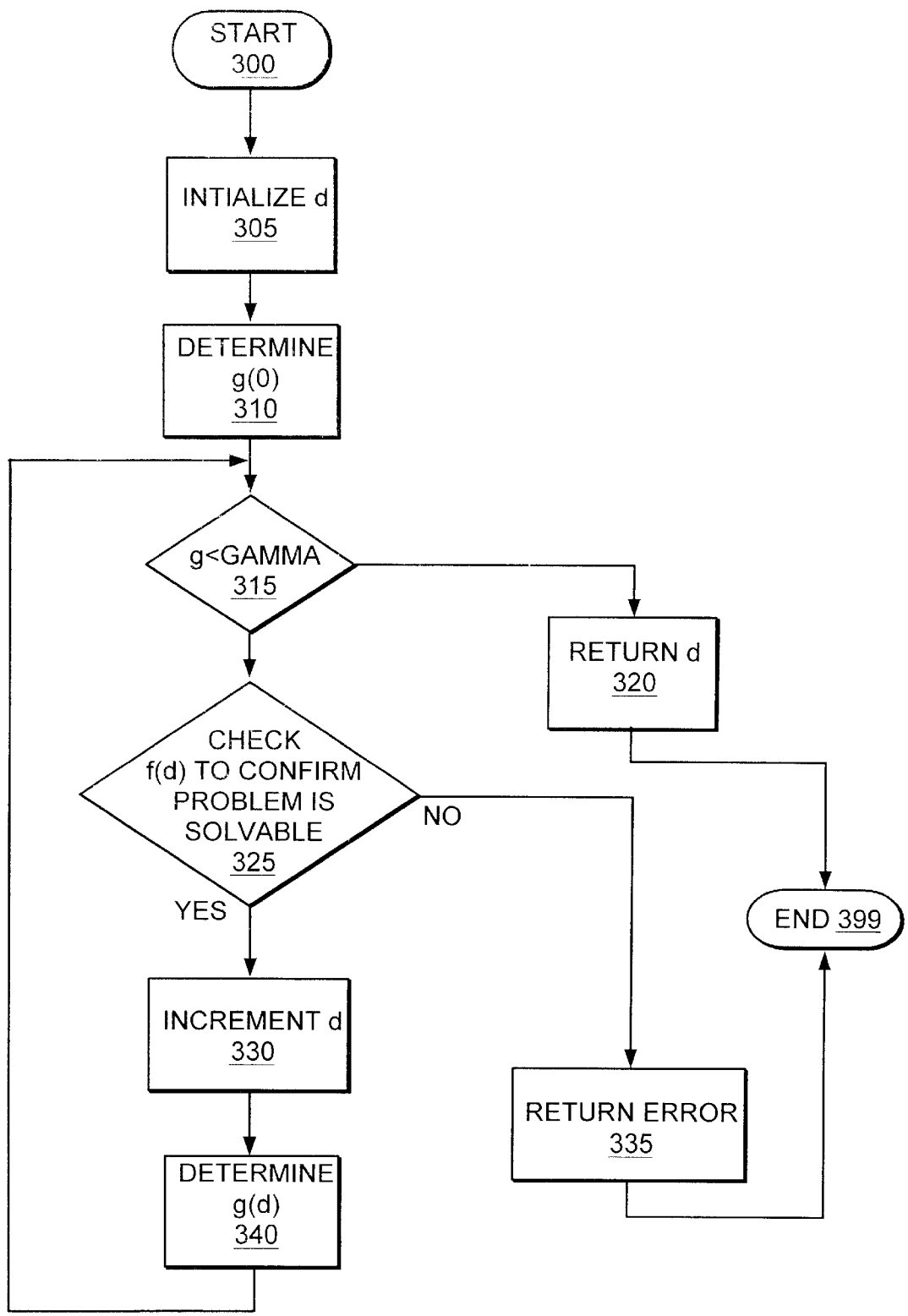
FIG. 3 is a flow chart illustrating exemplary logic of certain embodiments for determining a dormancy timer value of a given user.

FIG. 3 is a flowchart showing the logic of certain embodiments. The following paragraphs describe this logic with a specific example. Assume that the optimality parameter $\xi$ is 0.1, the gain parameter $\gamma=0.2$, the mean and standard deviation a are both 10 seconds, and the silent period probability distribution is given by $$P(\text{silent period} = x) = .85 \text{ if } x = 5$$
$$= .15 \text{ if } x = 46$$
$$= 0 \text{ otherwise}$$

The logic starts in 300 and proceeds to 305 where a timer value d is initialized to 0. At 310 an initial calculation is made for g(0). f(0) and h(0) are found accordingly by analysis of the relevant histogram of silence intervals. Referring to FIG. 4 which shows an exemplary (though simple) histogram (which does not correspond to the silence distribution above), f(0) will be relevant histogram area under the curve starting at $d+\overline{T}+3\sigma$. In the exemplary distribution above, since d=0, f(0) is the area of the histogram starting at $\overline{T}+3\sigma$ (specifically 10+30=40) and extending to infinity. In the example above, this is 0.15. Analogously, h(0) is the complete area under the histogram, which by definition is 1. Thus, g(0) equals 0.15/1, or simply 0.15.

At 315 the logic compares the gain function g value just calculated to $\gamma$ to determine if g is less than $\gamma$. If so, the logic loop breaks and the corresponding value of d is returned 320 as the value to use for the dormancy timer for the subscriber profile being analyzed. In the example above ( g=0.15 and $\gamma=0.2$) and in many interesting cases, the value of g(0) will not exceed y for d equal to 0 and thus the logic will drop to act 325 rather than break from the loop on the first instance.

In 325 a check is made of f(d) to confirm that it does not equal zero. If it does equal zero, an error is returned 335 as the problem is not solvable by the logic and instead a default value may be used for 'd'. (This may be useful for example to avoid errors during initialization and for periods where histogram data is unreliable.) In the example above f(0) is not equal to zero and thus the logic proceeds to 330.

In act 330, the value of d is incremented by a predefined value. This may simply be the number one, measured in whatever number of units makes sense, e.g., seconds or fractions thereof. The logic proceeds to 340.

In 340, g(d) is calculated, as described above but now with the new, incremented value of d. In an exemplary embodiment, this would calculate (for this iteration of the loop) g(1). Analogously to that described above, g(1) equals f(1)/h(1). By inspection of the silence distribution, one may see that g(1) equals 0.15. The logic loops back to 315 to determine if this value of d is optimal within parametery.

By inspection one can see that the above logic will continue to iterate, and in turn increment dormancy timer variable d, until d equals 6. For the example above, g(6) equals f(6)/h(6); f(6) equals the area under the curve from 6+10+30 extending to infinity, which is 0.15; and h(6) equals the area under the curve from 6 extending to infinity, which is 0.15. Thus, g(6) equals 1 and is greater than γ.

The above logic utilizes the probability density functions $f_T(t)$ $f_S(s)$, or approximations thereof. Under certain embodiments, these statistics are maintained as a histogram (e.g., FIG. 4) and under certain preferred embodiments, the statistics are exponentially smoothed and weighted to give more weight to the more recent statistics. Other embodiments may utilize other forms of statistics, e.g., such as statistics for certain times of day or year.

As outlined above, the statistics may be maintained per user of class of subscriber. However, the statistics may be maintained, under certain embodiments, more granularly, such as via pairing subscriber and destination. A global distribution may be maintained for talk time distribution.

Under certain embodiments of the invention, $f_T(t)$ and $f_S(s)$ are estimated using measurements. In the absence of any historic data, discrete approximations to these distributions are obtained. One simple way to do this is to build a measurement system in which the time axis is divided into measurement windows, or bins, and in each window measurements are collected to form a histogram. Under some embodiments, the current windows' data is kept, and statistically smoothed, to capture the past.

Certain embodiments keep one such histogram for each subscriber/destination pair, and one global histogram for talk time distribution. These can be maintained by the MSC or the BSC/PCF entities. In these cases where the MSC maintains the subscriber relevant statistics, the dormancy timer values per subscriber need to be communicated to the BSC/PCF complex. One way of achieving this communication is to use the MGCP/H-248 control protocol. In such case, the information elements (IEs) may be "overloaded" to carry the dormancy timer relevant information. The per subscriber based statistics may be kept as part of the subscriber profile information, from which the information may be obtained by the MSC and to which the MSC may provide updated statistics.

Based on the CPU time and memory requirements, K buckets are allocated for each histogram. Let W be the width of a bucket; i.e., bucket $b_{ij}^k$ is a counter storing the number of times the silent period for subscriber i and destination j, during the current measurement window, was between kW and (k+1)W; $1 \leq k \leq K$.

To account for silent periods falling outside the range of our buckets, we need to more rigorously define the buckets as follows.

I: Initial time

W: Bucket width

K : Total number of buckets for this histogram $b_{ij}^I$: Counter that stores the number of times the silent period was between 0 and I, in the current measurement window.

$b_{ij}^k$: Counter that stores the number of times the silent period was between I+(k−1)W to I+kW; $2 \leq k \leq K-1$, in the current measurement window.

$b_{ij}^k$: Counter that stores the number of times the silent period was between I+(K−1)W to ∞.

A typical histogram would look like FIG. 4.

Under certain embodiments, the subscriber statistics may be maintained in the subscriber profile. These statistics may then be obtained and modified as explained above based on history or smoothing algorithms.

Under certain embodiments time units can be measured in seconds.

It will be further appreciated that the scope of the present invention is not limited to the above-described embodiments, but rather is defined by the appended claims, and that these claims will encompass modifications of and improvements to what has been described.

What is claimed is:

1. A method of maintaining dormancy timers in a wireless wide area network, comprising:

monitoring subscriber usage to determine subscriber usage statistics;

based on the subscriber statistics determining a dormancy timer value for a given subscriber; wherein a dormancy timer value 'd' is determined by maximizing the equation $$g(d) = \frac{f(d)}{h(d)}$$

within a specified parameter, wherein f(d) is a histogram approximation of the equation $$f(d) \approx \int_{d+\overline{T}+3\sigma}^{\infty} f_S(s)ds$$

in which $\overline{T}$ is the mean talk period and σ is the standard deviation of the silence period distribution $f_s(s)$, and s is the variable for silence period for a user, and wherein h(d) is a histogram approximation of the equation $$h(d) \approx \int_{d}^{\infty} f_S(s)ds$$

:and setting a dormancy timer for the given subscriber with the dormancy timer value, wherein the dormancy timer is used to trigger relinquishment of a communication resource.

2. The method of claim 1 wherein the subscriber usage statistics are for a given user.

3. The method of claim 1 wherein the subscriber usage statistics are for a class of subscriber.

4. The method of claim 1 wherein the subscriber usage statistics include a probability density histogram of silent time periods of a given subscriber.

5. The method of claim 1 wherein a BSC complex controls communications to mobile stations responsively to dormancy timers and wherein the act of setting a dormancy timer value for a given subscriber includes the act of communicating the dormancy timer value to the BSC complex via an overloaded message.

* * * * *